United States Patent
Komatsu et al.

(10) Patent No.: US 11,618,462 B2
(45) Date of Patent: Apr. 4, 2023

(54) IN-VEHICLE CONTROL SYSTEM

(71) Applicant: Hitachi Astemo, Ltd., Hitachinaka (JP)

(72) Inventors: Shigenobu Komatsu, Tokyo (JP);
Hiroshi Shinoda, Ibaraki (JP);
Hideyuki Sakamoto, Ibaraki (JP);
Masaru Kokubo, Tokyo (JP);
Hidetatsu Yamamoto, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 173 days.

(21) Appl. No.: 17/414,814

(22) PCT Filed: Oct. 11, 2019

(86) PCT No.: PCT/JP2019/040203
§ 371 (c)(1),
(2) Date: Jun. 16, 2021

(87) PCT Pub. No.: WO2020/137091
PCT Pub. Date: Jul. 2, 2020

(65) Prior Publication Data
US 2022/0017108 A1  Jan. 20, 2022

(30) Foreign Application Priority Data
Dec. 26, 2018 (JP) .............................. JP2018-242005

(51) Int. Cl.
*B60W 50/00* (2006.01)
*B60W 50/02* (2012.01)
(Continued)

(52) U.S. Cl.
CPC ...... *B60W 50/0205* (2013.01); *B60W 50/029* (2013.01); *G07C 5/0816* (2013.01);
(Continued)

(58) Field of Classification Search
CPC ........... B60W 50/0205; B60W 50/029; B60W 2050/021; B60W 2050/0215;
(Continued)

(56) References Cited

U.S. PATENT DOCUMENTS

| 11,496,412 B2 * | 11/2022 | Yousefi ............... H04W 72/541 |
| 2005/0035656 A1 | 2/2005 | Kuramochi et al. |
| 2014/0172236 A1 | 6/2014 | Nishikawa et al. |

FOREIGN PATENT DOCUMENTS

| JP | H07-033079 U | 6/1995 |
| JP | 2001-307293 A | 11/2001 |

(Continued)

OTHER PUBLICATIONS

International Search Report with English translation and Written Opinion issued in corresponding application No. PCT/JP2019/040203 dated Dec. 24, 2019.

*Primary Examiner* — Ian Jen
(74) *Attorney, Agent, or Firm* — Foley & Lardner LLP

(57) ABSTRACT

Provided is an in-vehicle control system capable of reducing an increase in cost accompanying advancement of a fallback operation. Therefore, the in-vehicle control system includes: a plurality of control circuits 3 and 4 respectively including control units that perform data communication with each other; an external environment recognition sensor a5; and a plurality of wirings 11, 12, 13, and 14 connecting the external environment recognition sensor a5 and the plurality of control circuits 3 and 4. The plurality of control circuits 3 and 4 include: a first power supply unit that supplies power to the external environment recognition sensor a5 via a corresponding wiring among the plurality of wirings 11, 12, 13, and 14; and a first detection unit that detects an abnormality related to the power supplied to the external environment recognition sensor a5. A control unit in a control device including a first detection unit that has detected the (Continued)

abnormality is controlled to acquire data of the external environment recognition sensor a5 from a control unit included in the other control device.

10 Claims, 8 Drawing Sheets

(51) Int. Cl.
  *B60W 50/029* (2012.01)
  *G07C 5/08* (2006.01)
(52) U.S. Cl.
  CPC ............. *B60W 2050/021* (2013.01); *B60W 2050/0215* (2013.01)
(58) Field of Classification Search
  CPC ......... B60W 2050/0292; G07C 5/0816; B60R 16/02; B60R 16/023; G08C 25/00
  See application file for complete search history.

(56) References Cited

FOREIGN PATENT DOCUMENTS

| | | |
|---|---|---|
| JP | 2004-338577 A | 12/2004 |
| JP | 2009-120076 A | 6/2009 |
| JP | 2013-028312 A | 2/2013 |

\* cited by examiner

IN-VEHICLE CONTROL SYSTEM

TECHNICAL FIELD

The present invention relates to an in-vehicle control system, and for example, relates to an in-vehicle control system that executes control of a vehicle based on data received from a sensor (in-vehicle sensor) mounted on an automobile.

BACKGROUND ART

Automatic driving of automobiles has progressed. If a driver is not required with the progress of the automatic driving, there is a demand for a safe operation only by an in-vehicle control system without a person intervening in driving even when a failure occurs in an automobile. Duplication of the in-vehicle control system including a power supply has been studied in order for the safe operation even when there is a failure. PTL 1 discloses a technique for switching a power supply path and a data path from a sensor when there is an abnormality in data transmitted from the sensor to a control circuit in a steering system.

In addition, the number of in-vehicle sensors increases as the automatic driving progresses. For example, the number of external environment recognition sensors increases in order to recognize a situation around a vehicle. Examples of the external environment recognition sensor include a sensor such as a camera, a radar, and LIDAR (Light Detection and Ranging, Laser Imaging Detection and Ranging). As the number of in-vehicle sensors increases, the number of power supply wirings for supplying power to the in-vehicle sensors and the number of signal wirings for transferring data of the in-vehicle sensors increase, which causes problems in terms of a wiring space and a wiring weight. In order to solve such problems, a power over coaxial (PoC) technology capable of transmitting power supply and data transfer to in-vehicle sensors using a single coaxial cable has been adopted.

CITATION LIST

Patent Literature

PTL 1: JP 2009-120076 A

SUMMARY OF INVENTION

Technical Problem

When a failure occurs in an automobile, some functions of automatic driving may be limited, but an operation for ensuring safety, that is, a fallback operation is required. Various operations are also conceivable as the fallback operation. For example, at least stopping without reckless driving is conceivable as a minimum required safety operation for an in-vehicle control system. Further, even in the case of stopping, it is safer to stop an automobile by moving the automobile to a road shoulder rather than stopping in the same lane. In this case, the in-vehicle control system needs to grasp a surrounding situation.

Further, in a case where a width of a roadway is narrow and there is no space for stopping on a road shoulder, or in a case where visibility is poor, an automobile is caused to travel to a place where there is a sufficient space for stopping on a road shoulder or a place where visibility is good. In addition, in the case of traveling on a highway, it is safer to perform an operation such as causing an automobile to travel up to a service area. Furthermore, it is most desirable to enable self-traveling up to an automobile factory even if a failure occurs in a robot taxi or the like that realizes fully automated driving. However, as the automatic driving operation at the time of failure is advanced, the number of redundant portions of the in-vehicle control system increases, which leads to an increase in cost. For example, it is sufficient to make some of a brake system, a steering system, and front and rear external environment recognition sensors redundant only for the safe stop, but it is also necessary to make left and right external environment recognition sensors redundant in the case of the stop on the road shoulder.

Further, the traveling distance is extended in order for the stop at a safer road shoulder or evacuation space. In this case, the number of external environment recognition sensors that require redundancy further increases. In addition, a high computation capability is required for the in-vehicle control system that determines the surrounding situation based on data of the external environment recognition sensor, determines a trajectory of the automobile, and controls the operation of the vehicle. As the number of redundant portions is increased in this manner, a safe and comfortable operation can be realized even at the time of failure, but the cost increases. It is expected that cost reduction will become a problem while advancing the fallback operation as the automatic driving progresses from now on. In particular, the number of external environment recognition sensors has increased along with the progress of the automatic driving, and is greatly affected in the case of implementing the redundancy In addition, there is a problem of switching of a power supply system as a specific problem when a power supply fails. For example, if the power supply system is made redundant, power can be supplied from a redundant power supply system to a target device even when an abnormality occurs in a normal power supply system. In this case, when the normal power supply system is switched to the redundant power supply system, there is a concern that the power supply to the target device is interrupted for a certain period of time. Alternatively, it is also concerned that a change of a power supply voltage at the time of switching becomes a power supply fluctuation so as to prevent the target device from normally operating. In either case, there is a possibility that a problem occurs in control of a vehicle. In particular, in the external environment recognition sensor or the in-vehicle control system, there is a possibility that a start-up sequence after the interruption of the power supply becomes complicated, and it takes time for the start-up as a system becomes complicated. In a traveling automobile, the occurrence of a loss time of a function of the system increases problems in terms of safety.

Therefore, regarding a power supply abnormality such as a power supply failure, it is important to switch to the redundant power supply system so as not to cause an abnormal operation of the device due to the power supply fluctuation without interrupting the supply of power in any way.

For example, in PTL 1, the presence of an abnormality in power supply to the sensor is detected by an abnormality of a signal from the sensor. Therefore, there is a time during which the sensor is in an abnormal state, and it is concerned that the control of an automobile is affected.

In addition, a technique is known in which two systems of power are input by a diode OR, and the output power of the diode OR is supplied to a target device. According to this technique, power can be continuously supplied even when one power supply voltage drops. However, there is a problem that a power loss due to the diode is larger than that in a power supply switch. In addition, if the target device is short-circuited to the power supply (power supply fault) without passing through the diode, there is a problem that a high voltage higher than a normal power supply voltage is supplied to the device so that it is difficult to prevent the occurrence of the abnormality in the device due to the supply of the high voltage. Further, in a case where an external environment recognition sensor is connected by PoC, the power supply and the data transfer of the sensor are performed by the same wiring, and thus, it is also necessary to switch a path for transferring the sensor data in addition to the power supply.

An object of the present invention is to provide an in-vehicle control system capable of reducing an increase in cost accompanying advancement of a fallback operation. In addition, another object of the present invention is to provide an in-vehicle control system capable of speeding up switching from a normal power supply to a redundant power supply when a power supply abnormality occurs.

Other objects and novel characteristics in addition to the above-described ones of the present invention will be apparent from description of the present specification and the attached drawings.

Solution to Problem

An overview of representatives of the invention to be disclosed in the present application will be simply described as follows.

That is, an in-vehicle control system includes: a plurality of control devices respectively including control units that perform data communication with each other; a first sensor; and a plurality of wirings that connect the first sensor and the plurality of control devices. Here, each of the plurality of control devices includes a first power supply unit that supplies power to the first sensor via a corresponding wiring among the plurality of wirings, and a first detection unit that detects an abnormality related to the power supplied to the first sensor. A control unit in a control device including a first detection unit that has detected the abnormality is controlled to acquire data of the first sensor from a control unit included in another control device.

Advantageous Effects of Invention

An effect that can be obtained by the representatives of the invention to be disclosed in the present application will be simply described as follows.

It is possible to provide the in-vehicle control system capable of reducing the increase in cost accompanying the advancement of the fallback operation.

DESCRIPTION OF EMBODIMENTS

In the embodiments below, although a description will be given by dividing the embodiment into a plurality of sections or embodiments if necessary for convenience, these are not irrelevant to each other excepting the case that is particularly demonstrated, but are in a relationship in which one is a modified example of part or all of the other, a detailed description, a supplementary description, or the like. In addition, in the embodiments below, when the number of elements and the like (including the number, a numeric value, a quantity, a range, and the like) are stated, the embodiment is not limited to a particular number excepting the case that is particularly demonstrated or a case in which the embodiment is clearly limited, in principle, to the particular number, and the number may be more than or less than the particular number.

Further, in the embodiments below, it is obvious that the constituent components (including component steps and the like) are not necessarily required, excepting the case that is particularly demonstrated or a case in which the components are clearly required in principle. Similarly, in the embodiments below, when shapes, positional relationships and the like of the constituent components are stated, it is assumed that those substantially approximate to or analogous to the shapes and the like are included excepting the case that is particularly demonstrated or a case in which the components are obviously inappropriate in principle. This also applies to the numeric value and the range described above.

Hereinafter, embodiments of the present invention will be described in detail based on the drawings. Incidentally, the same reference signs will be attached to the same members, in principle, in the entire drawing for describing the embodiments, and the repetitive description thereof will be omitted in principle.

First Embodiment

Comparative Example

Figure 8:
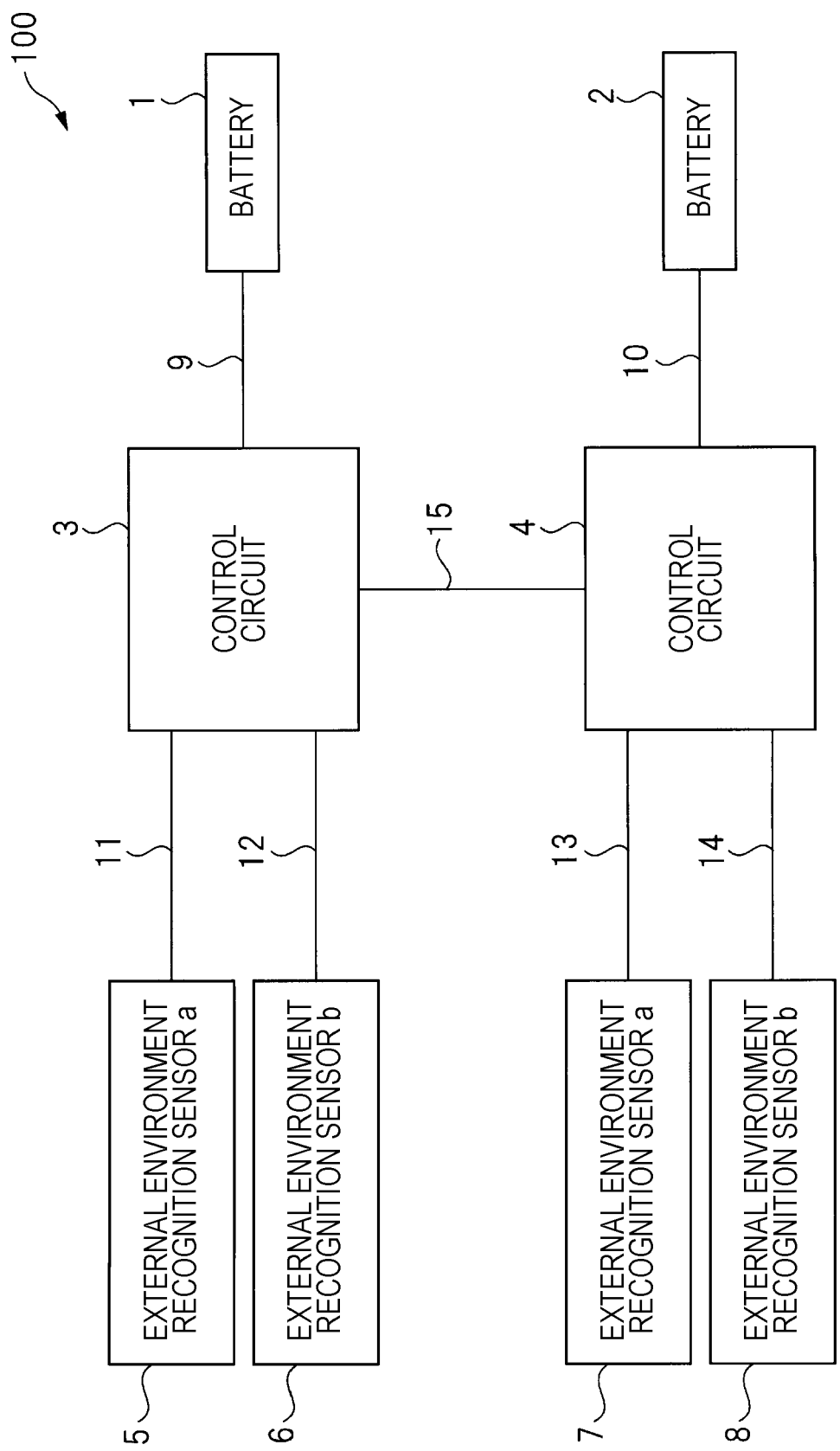
FIG. 8 is a block diagram illustrating a configuration of a comparative example studied by the present inventors.

In order to facilitate understanding of an in-vehicle control system according to a first embodiment, a comparative example in which full redundancy is implemented and which has been studied by the present inventors prior to the present invention will be described before describing the first embodiment. FIG. 8 is a block diagram illustrating a configuration of the comparative example studied by the present inventors.

In FIG. 8, reference sign 100 denotes an in-vehicle control system. Each block forming the in-vehicle control system 100 is not particularly limited, but is mounted on an automobile (self-driving vehicle) capable of self-driving (not illustrated). In the self-driving vehicle, the in-vehicle control system 100 is made redundant in order to realize a fallback operation even if a failure occurs in a part. That is, the redundancy is implemented in the in-vehicle control system 100 by providing two in-vehicle control systems of a first in-vehicle control system and a second in-vehicle control system. The first in-vehicle control system includes: an external environment recognition sensor a5 and an external environment recognition sensor b6 that acquire surrounding information of the automobile; a control circuit 3 that grasps a situation around the vehicle based on data of the external environment recognition sensor a5 and the external environment recognition sensor b6 and controls an operation of the automobile; and a battery 1 that supplies power. Similarly to the first in-vehicle control system, the second in-vehicle control system includes an external environment recognition sensor a7 and an external environment recognition sensor b8, a control circuit 4, and a battery 2.

As a result, even if a certain failure occurs in the first in-vehicle control system, the vehicle can be controlled by the second in-vehicle control system, so that the fallback operation can be realized. In addition, the control circuit 3 and the control circuit 4 are connected by a signal wiring 15, the control circuit 3 and the control circuit 4 communicate with each other using the signal wiring 15, and, for example, information regarding the failure can be shared between the control circuit 3 and the control circuit 4.

In FIG. 8, reference signs 9 and 10 denote power supply wirings configured to supply power supply voltages from the batteries 1 and 2 to the control circuits 3 and 4. In addition, in FIG. 8, reference signs 11 to 14 denote wirings that connect the external environment recognition sensor a5, the external environment recognition sensor b6, the external environment recognition sensor a7, and the external environment recognition sensor b8 to the control circuits 3 and 4. The control circuits 3 and 4 supply the power supply voltages to the external environment recognition sensor a5, the external environment recognition sensor b6, the external environment recognition sensor a7, and the external environment recognition sensor b8 via the wirings 11 to 14. The external environment recognition sensor a5, the external environment recognition sensor b6, the external environment recognition sensor a7, and the external environment recognition sensor b8 operate using the supplied power supply voltages as operating voltages, and supply the acquired surrounding information of the automobile, as data, to the control circuits 3 and 4 via the wirings 11 to 14. That is, the wirings 11 to 14 function as signal wirings that transfers sensor data and power supply wirings that supply the power supply voltages.

In the comparative example, the fallback operation can be realized by implementing the redundancy, but the number of components and the number of wirings are increased by the redundancy, so that cost increases. In particular, the number of external environment recognition sensors increases along with the advancement of automatic driving. Therefore, when the advancement of the automatic driving is achieved, the increase in cost due to the redundancy further increases.

<Configuration of In-Vehicle Control System>

Figure 1:
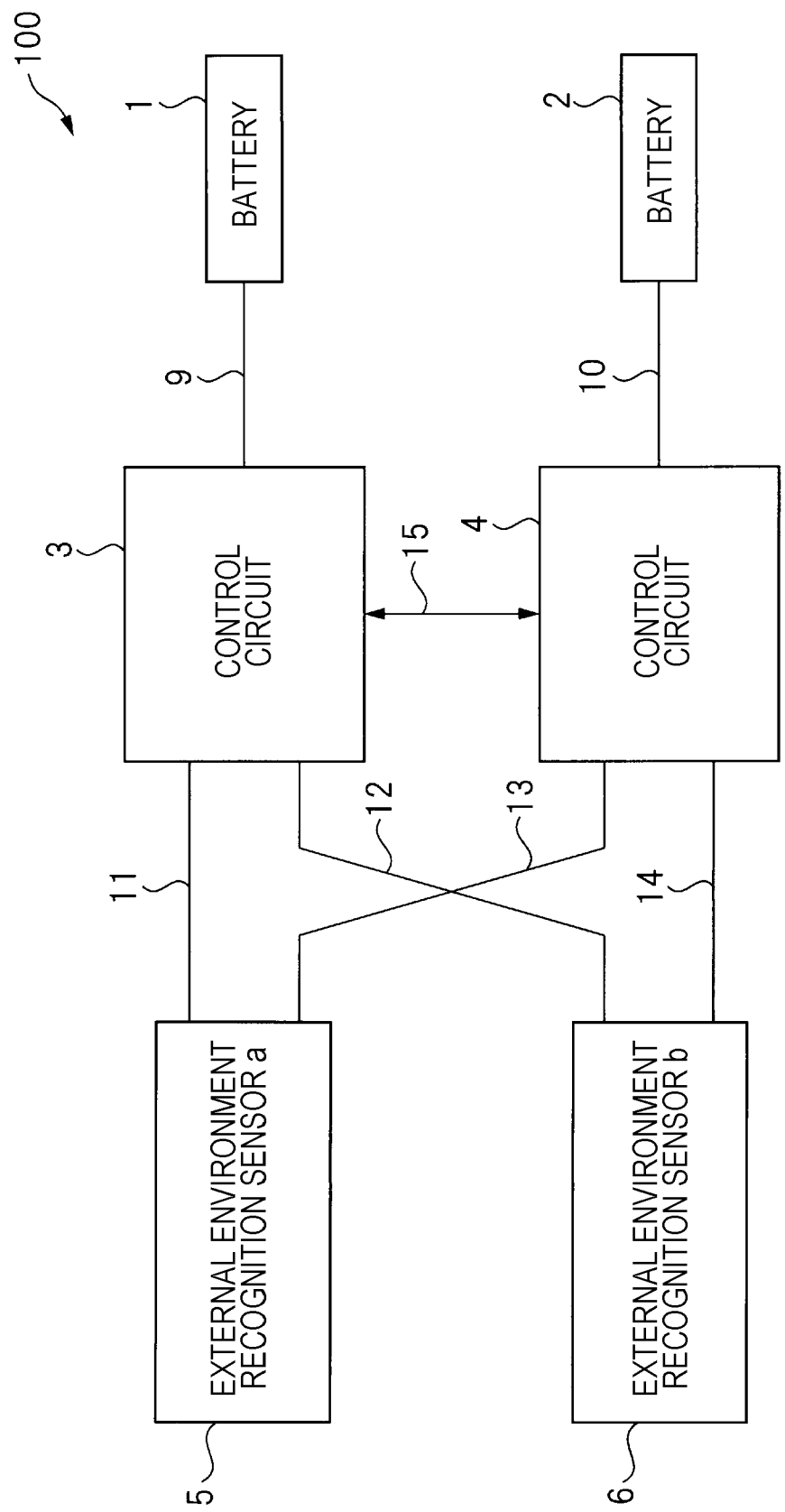
FIG. 1 is a block diagram illustrating a configuration of an in-vehicle control system according to a first embodiment.

FIG. 1 is a block diagram illustrating a configuration of an in-vehicle control system according to the first embodiment. In the drawing, reference sign 100 denotes the in-vehicle control system. Similarly to FIG. 8, each block forming the in-vehicle control system 100 is mounted on a self-driving vehicle (not illustrated). Although not particularly limited, a description will be given in the first embodiment regarding the in-vehicle control system that grasps a situation around the self-driving vehicle and controls the self-driving vehicle using two external environment recognition sensors a5 and b6.

The external environment recognition sensor a5 and the external environment recognition sensor b6 are configured using different external environment recognition sensors. For example, the external environment recognition sensor a5 and the external environment recognition sensor b6 are configured using different types of sensors. Alternatively, when the external environment recognition sensors a5 and b6 are configured using the same type of sensors, measuring directions, angles, and/or distances are different between the external environment recognition sensors a5 and b6. As an example, the external environment recognition sensors a5 and b6 are configured using the same camera as the type of sensors. However, the external environment recognition sensor a5 is mounted at a position for capturing, for example, the front side of the self-driving vehicle, and the external environment recognition sensor b6 is mounted at a position for capturing the rear side of the self-driving vehicle. In order for the in-vehicle control system 100 to realize desired vehicle control for the self-driving vehicle, only the information acquired by one of the external environment recognition sensors a5 and b6 is insufficient, and pieces of the information acquired by both the external environment recognition sensors are required.

The in-vehicle control system 100 includes batteries 1 and 2, control circuits 3 and 4, the external environment recognition sensor a5, and the external environment recognition sensor b6. The battery 1 is connected to the control circuit 3 by a power supply wiring 9, and the battery 2 is connected to the control circuit 4 by a power supply wiring 10. As a result, a power supply voltage is supplied from the battery 1 to the control circuit 3 via the power supply wiring 9, and a power supply voltage is supplied from the battery 2 to the control circuit 4 via the power supply wiring 10.

The control circuits 3 and 4 operate using the power supply voltages supplied from the batteries 1 and 2 as operating voltages. In addition, the control circuits 3 and 4 generate power supply voltages for operating the external environment recognition sensors a5 and b6 based on the power supply voltages supplied from the batteries 1 and 2, and supply the generated power supply voltages to the external environment recognition sensors a5 and b6.

The control circuit 3 is connected to the external environment recognition sensor a5 by a wiring 11, and is connected to the external environment recognition sensor b6 by a wiring 12. In addition, the control circuit 4 is connected to the external environment recognition sensor b6 by a wiring 14, and is connected to the external environment recognition sensor a5 by a wiring 13. In addition, the control circuits 3 and 4 are connected by a signal wiring 15.

In the first embodiment, while a failure such as a power supply abnormality does not occur, that is, during a normal operation (typical operation), the external environment recognition sensors and the control circuits have a one-to-one correspondence. However, the correspondence relationship is automatically changed when a failure occurs and a fallback operation is performed, that is, during a redundant operation.

That is, during the normal operation, the external environment recognition sensor a5 corresponds to the control circuit 3, power is supplied from the control circuit 3 to the external environment recognition sensor a5 using the wiring 11, and communication is performed between the control circuit 3 and the external environment recognition sensor a5 using the wiring 11. In addition, during the normal operation, the external environment recognition sensor b6 corresponds to the control circuit 4, power is supplied from the control circuit 4 to the external environment recognition sensor b6 using the wiring 14, and communication is performed between the control circuit 4 and the external environment recognition sensor b6 using the wiring 14.

On the other hand, during the redundant operation, either the control circuit 3 or the control circuit 4 corresponds to both the external environment recognition sensors a5 and b6. For example, when the control circuit 3 corresponds to both the external environment recognition sensors during the redundant operation, the control circuit supplies power to the external environment recognition sensor a5 and communicates with the external environment recognition sensor a5 using the wiring 11 as in the normal operation. In addition, the control circuit 3 supplies power to the external environment recognition sensor b6 using the wiring 12, and communicates with the external environment recognition sensor b6 using the wiring 12. Similarly, when the control circuit 4 corresponds to both the external environment recognition sensors during the redundant operation, the control circuit 4 supplies power to the external environment recognition sensor b6 and communicates with the external environment recognition sensor b6 using the wiring 14 as in the normal operation. In addition, the control circuit 4 supplies power to the external environment recognition sensor a5 using the wiring 13, and communicates with the external environment recognition sensor a5 using the wiring 13.

In this manner, the wirings 12 and 13 are used during the redundant operation, and thus, will be referred to as redundant wirings 12 and 13 hereinafter. On the other hand, the wirings 11 and 14 are used not only during the redundant operation but also during the normal operation, and thus, will be referred to as normal wirings hereinafter.

<<Operation of In-Vehicle Control System During Normal Operation>>

The external environment recognition sensor a5 operates using a power supply voltage supplied from the control circuit 3 via the normal wiring 11 as an operating voltage. The external environment recognition sensor a5 outputs information according to a situation around the vehicle (external environment situation), for example, information obtained by capturing the front side of the vehicle, to the normal wiring 11 as sensor data. This data propagates through the normal wiring 11 and is supplied to the control circuit 3. In addition, the external environment recognition sensor b6 operates using a power supply voltage supplied from the control circuit 4 via the normal wiring 14 as an operating voltage. The external environment recognition sensor b6 outputs information according to a situation around the vehicle, for example, information obtained by capturing the rear side of the vehicle, to the normal wiring 14 as sensor data. This data propagates through the normal wiring 14 and is supplied to the control circuit 4.

The control circuit 3 and the control circuit 4 are connected by the signal wiring 15, and the control circuit 3 and the control circuit 4 communicate with each other via the signal wiring 15. That is, the control circuit 3 transmits the sensor data acquired from the corresponding external environment recognition sensor a5 to the control circuit 4 via the signal wiring 15. In addition, the control circuit 4 transmits the sensor data acquired from the corresponding external environment recognition sensor b6 to the control circuit 3 via the signal wiring 15. As a result, each of the control circuits 3 and 4 acquires the data from the external environment recognition sensors a5 and b6. Each of the control circuits 3 and 4 performs processing such as predetermined control calculation on the acquired data from the external environment recognition sensors a5 and b6, and recognizes the situation around the vehicle, for example, the front side and the rear side of the vehicle based on the data from the external environment recognition sensors a5 and b6. The control circuits 3 and 4 control the vehicle according to the recognized situation around the vehicle.

In addition, a result of the predetermined control calculation executed in the control circuit 3 is transmitted to the control circuit 4 via the signal wiring 15. Similarly, a result of the predetermined control calculation executed in the control circuit 4 is transmitted to the control circuit 3 via the signal wiring 15. The control circuit 3 compares the result of the predetermined control calculation executed by itself with the control calculation result in the control circuit 4 received via the signal wiring 15. Similarly, the control circuit 4 compares the result of the predetermined control calculation executed by itself with the control calculation result in the control circuit 3 received via the signal wiring 15. Through the comparison, it is possible to detect an abnormality in both the control circuits 3 and 4. Incidentally, the abnormality detected by the comparison is not particularly limited, but is notified from the control circuits 3 and 4 to a host system of the control circuits 3 and 4.

<<Operation of In-Vehicle Control System During Redundant Operation>>

Next, an operation of the in-vehicle control system 100 when a failure or the like occurs will be described. Here, a case where a disconnection or a short circuit occurs in the normal wiring 11 and a power supply abnormality occurs in the normal wiring 11 will be described as an example.

The external environment recognition sensor a5 operates using a power supply voltage supplied from the control circuit 4 via the redundant wiring 13 as an operating voltage. In this case, information around the vehicle acquired by the external environment recognition sensor a5 is output to the redundant wiring 13 as sensor data. At this time, the external environment recognition sensor b6 operates using a power supply voltage supplied via the normal wiring 14 as an operating voltage as in the normal operation. Through the operation, information around the vehicle acquired by the external environment recognition sensor b6 is output to the normal wiring 14 as sensor data.

The control circuit 4 receives the sensor data from the external environment recognition sensor a5 via the redundant wiring 13, and receives the sensor data from the external environment recognition sensor b6 via the normal wiring 14. The control circuit 4 transmits the received data from the external environment recognition sensor a5 and the received data from the external environment recognition sensor b6 to the control circuit 3 via the signal wiring 15. As a result, each of the control circuits 3 and 4 acquires both the data from the external environment recognition sensor b6 and the data from the external environment recognition sensor a5 as in the normal operation.

Each of the control circuits 3 and 4 performs predetermined control calculation on the acquired data from both the external environment recognition sensors, recognizes the situation around the vehicle, and controls the vehicle as in the normal operation. In addition, a result of the predetermined control calculation executed in the control circuit 3 is transmitted to the control circuit 4 via the signal wiring 15, and a result of the predetermined control calculation executed in the control circuit 4 is transmitted to the control circuit 3 via the signal wiring 15. Each of the control circuits 3 and 4 compares the results of the predetermined control calculation to detect an abnormality as in the normal operation. As a result, even when an abnormality occurs in the control circuit 3 or 4, the abnormality can be detected. Even during the redundant operation, the control circuits 3 and 4 notify the host system of the abnormality detected by the comparison.

As a result, even when there is an abnormality in the normal wiring 11, both the control circuit 3 and the control circuit 4 can control the vehicle based on the pieces of data of both the external environment recognition sensor a5 and the external environment recognition sensor b6, and perform control equivalent to that in the normal operation.

Although the case where the power supply abnormality occurs in the normal wiring 11 has been described as an example, the in-vehicle control system 100 can perform control equivalent to that in the normal operation even when a power supply abnormality occurs in the normal wiring 14. That is, when the power supply abnormality occurs in the normal wiring 14, power is supplied from the control circuit 3 to the external environment recognition sensor b6 through the redundant wiring 12, and data of the external environment recognition sensor b6 is transmitted to the control circuit 3 through the redundant wiring 12. The control circuit 3 transmits pieces of data of the external environment recognition sensor a5 and the external environment recognition sensor b6 to the control circuit 4 through the signal wiring 15. As a result, even when the power supply abnormality occurs in the normal wiring 14, each of the control circuits 3 and 4 can control the vehicle based on the pieces of data of both the external environment recognition sensors a5 and b6, and can perform control equivalent to that in the normal operation.

According to the first embodiment, the number of external environment recognition sensors can be reduced to half as compared with the comparative example (FIG. 8) in which the full redundancy is implemented. As a result, it is possible to provide the in-vehicle control system capable of realizing the fallback operation while reducing the cost.

Second Embodiment

Figure 2:
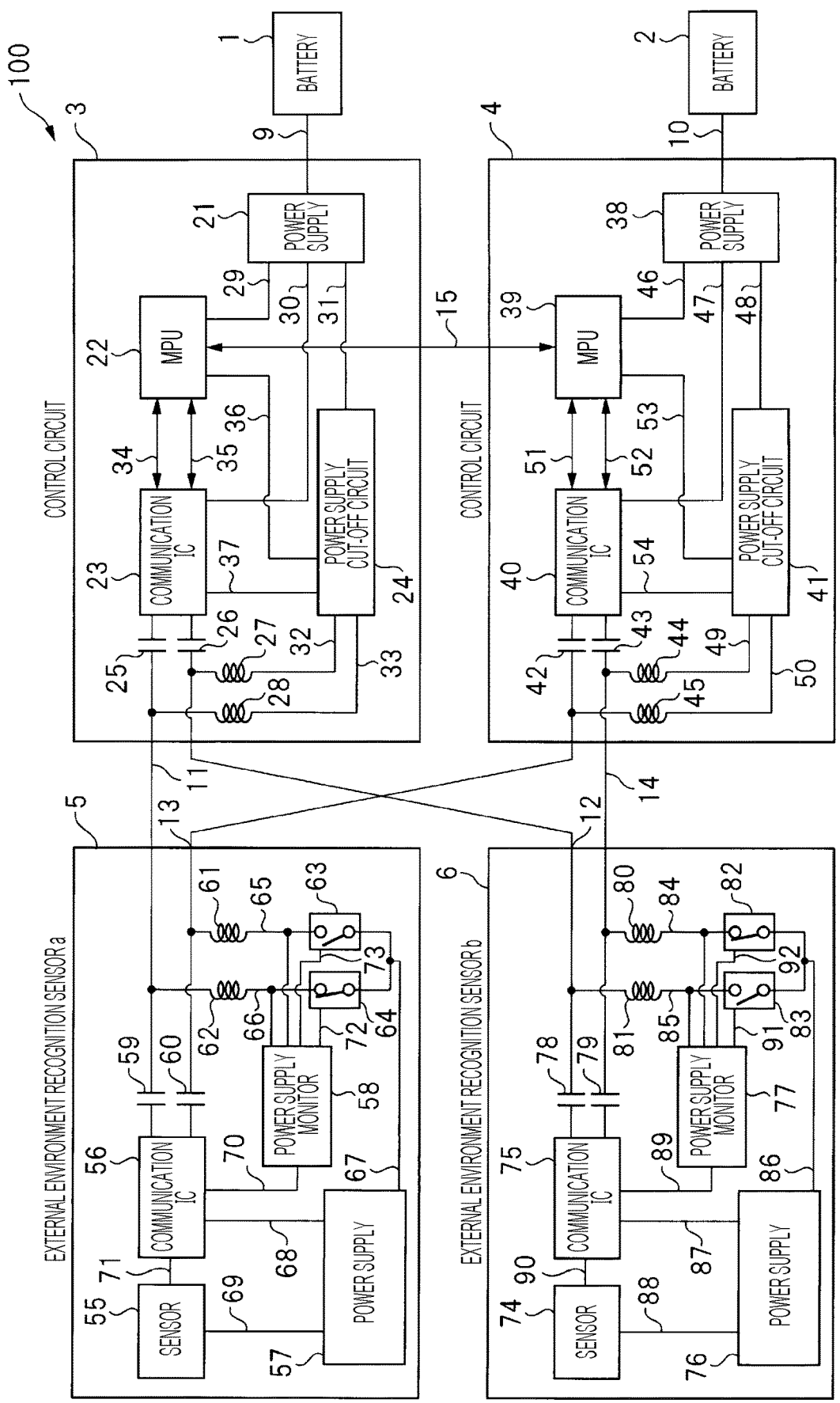
FIG. 2 is a block diagram illustrating a configuration of an in-vehicle control system according to a second embodiment.

FIG. 2 is a block diagram illustrating a configuration of an in-vehicle control system according to a second embodiment. In the second embodiment, an example of a more specific configuration of the in-vehicle control system 100 described in the first embodiment is presented.

FIG. 2 illustrates an example of specific configurations of the control circuit 3, the control circuit 4, and the external environment recognition sensors a5 and b6 illustrated in FIG. 1. Each of the normal wirings 11 and and the redundant wirings 12 and 13 connecting the external environment recognition sensors a5 and b6 and the control circuits 3 and 4 is configured using PoC for supplying a signal and a power supply voltage by one coaxial cable. That is, the power supply voltage is supplied by the one coaxial cable, and data for data communication is superimposed on the supplied power supply voltage.

The battery 1 is connected to the control circuit 3 by the power supply wiring 9, and a power supply voltage is supplied from the battery 1 to the control circuit 3 via the power supply wiring 9. Similarly, the battery 2 supplies a power supply voltage to the control circuit 4 via the power supply wiring 10.

Similarly to FIG. 1, the external environment recognition sensor a5 is connected to the corresponding control circuit 3 via the normal wiring 11, and is connected to the control circuit 4 via the redundant wiring 13. In addition, the external environment recognition sensor b6 is connected to the corresponding control circuit 4 via the normal wiring 14, and is connected to the control circuit 3 via the redundant wiring 12. As described above, each of the normal wirings 11 and 14 and the redundant wirings 12 and 13 is configured using one coaxial cable.

In the second embodiment, the control circuit 3 and the control circuit 4 have the same configuration, and the external environment recognition sensor a5 and the external environment recognition sensor b6 have the same configuration although not particularly limited. Therefore, the control circuit 3 and the external environment recognition sensor a5 will be described as representative examples of the control circuits and the external environment recognition sensors.

<Control Circuit>

The control circuit 3 includes a power supply (first power supply unit) 21, a processor (hereinafter, referred to as MPU) 22, a communication semiconductor device (hereinafter, referred to as a communication IC or a communication unit) 23, a power supply cut-off circuit 24, inductors 27 and 28, and capacitors 25 and 26.

The power supply 21 is connected to the battery 1 via the power supply wiring 9. The power supply 21 generates an operating voltage for operating the MPU 22, the communication IC 23, the power supply cut-off circuit 24, and the like from the power supply voltage supplied from the battery 1, and supplies power to the MPU 22, the communication IC 23, the power supply cut-off circuit 24, and the like via power supply wirings 29, 30, 31, and the like. The MPU 22 performs predetermined control calculation on sensor data supplied via signal wirings 34, 35, and 15. A situation around the vehicle is recognized by the predetermined control calculation executed by the MPU 22, so that the vehicle is controlled.

The communication IC 23 includes an input node connected to the normal wiring 11 via the capacitor 25 and an input node connected to the redundant wiring 12 via the capacitor 26. The input node of the communication IC 23 is disconnected from the normal wiring 11 and the redundant wiring 12 in terms of direct current by the capacitors 25 and 26, and sensor data that changes with a lapse of time in the normal wiring 11 and the redundant wiring 12 is supplied to the input node of the communication IC 23. The communication IC 23 supplies the sensor data, which has been supplied to the input node, to the MPU 22 via the signal wirings 34 and 35.

The power supply cut-off circuit 24 is connected to the communication IC 23 via a signal wiring 37, and is connected to the MPU 22 via a signal wiring 36. In addition, the power supply cut-off circuit 24 is connected to one end of the inductor 27 via a power supply wiring 32, and is connected to one end of the inductor 28 via a power supply wiring 33. The other end of the inductor 27 is connected to the redundant wiring 12, and the other end of the inductor 28 is connected to the normal wiring 11. The power supply cut-off circuit 24 generates a power supply voltage for operating an external environment recognition sensor based on a voltage supplied from the power supply 21 via the power supply wiring 31, and supplies the power supply voltage to the power supply wirings 32 and 33. In addition, the power supply cut-off circuit 24 monitors the voltage and current in the power supply wirings 32 and 33, and determines that an abnormality has occurred when a voltage value or a current value is out of a predetermined detection range. The power supply cut-off circuit 24 cuts off the supply of the power supply voltage to a power supply wiring determined to be abnormal. In addition, the power supply cut-off circuit 24 notifies the communication IC 23 and the MPU 22 of the detection of the abnormality by a control signal via the signal wirings 36 and 37.

The power supply wirings 32 and 33 are connected to the normal wiring 11 and the redundant wiring 12 via the inductors 27 and 28. Therefore, the supply of the power supply voltage to the power supply wiring in which the abnormality has been detected is cut off by the power supply cut-off circuit 24, so that the supply of the power supply voltage to the normal wiring 11 or the redundant wiring 12 connected to the power supply wiring in which the abnormality has been detected is cut off via the inductor. As a result, the external environment recognition sensor connected to the normal wiring 11 or the redundant wiring 12 to which the supply of the power supply voltage has been cut off is electrically disconnected from the power supply 21. A specific example of the power supply cut-off circuit 24 will be described later with reference to FIG. 5, and thus, the further description will be omitted.

As described above, the inductors 28 and 27 are connected between the normal wiring 11 and the redundant wiring 12, and the power supply wirings 33 and 32. The inductors 28 and 27 operate to disconnect the normal wiring 11, the redundant wiring 12, and the power supply wirings 33 and 32 from each other in terms of alternating current. As a result, the leakage of sensor data to the power supply 21 side is reduced when the sensor data that changes with a lapse of time is transmitted from the external environment recognition sensor to the normal wiring 11 and the redundant wiring 12.

That is, for PoC communication. the control circuit 3 according to the second embodiment includes: the inductor 27 that disconnects the power supply wiring 32 and the redundant wiring 12 in terms of alternating current; the inductor 28 that disconnects the power supply wiring 33 and the normal wiring 11 in terms of alternating current; the capacitor 25 that disconnects the input node of the communication IC 23 and the normal wiring 11 in terms of direct current; and the capacitor 26 that disconnects the input node of the IC 23 and the redundant wiring 12 in terms of direct current. As a result, the power supply voltage (power) as a DC component and the sensor data as an AC component are separated, and the power and the data can be simultaneously transmitted through the same wiring.

Since the control circuit 4 has the same configuration as the control circuit 3 as described above, only the correspondence relationship will be described. In the control circuit 4, a power supply 38 corresponds to the power supply 21, an MPU 39 corresponds to the MPU 22, a communication IC 40 corresponds to the communication IC 24, and a power supply cut-off circuit 41 corresponds to the power supply cut-off circuit 24. In addition, in the control circuit 4, an inductor 44 corresponds to the inductor 28, an inductor 45 corresponds to the inductor 27, a capacitor 43 corresponds to the capacitor 25, and a capacitor 42 corresponds to the capacitor 26.

The MPU 22 in the control circuit 3 and the MPU 39 in the control circuit 4 are connected by the signal wiring 15, and for example, sensor data is transmitted and received between the MPU 22 and the MPU 39 via the signal wiring 15.

Incidentally, the MPUs 22 and 39 can be regarded as control units in the second embodiment. In this case, the control circuits 3 and 4 can be regarded as a first control device and a second control device. In addition, the power supply cut-off circuits 24 and 41 detect an abnormality, and thus, can be regarded as first detection units. Further, the external environment recognition sensor a5 can be regarded as a first sensor, and the external environment recognition sensor b6 can be regarded as a second sensor, for example.

<External Environment Recognition Sensor>

The external environment recognition sensor a5 includes: a sensor (sensor unit) 55 that converts a situation around the vehicle, in other words, external environment information into an electrical signal; a communication IC 56; a power supply (second power supply unit) 57; a power supply monitor 58; switches 63 and 64; capacitors 59 and 60; and inductors 61 and 62.

As will be described later, a power supply wiring 67 is connected to the normal wiring 11 or the redundant wiring 13 via the switch 64 or 63 and the inductor 62 or 61, and a power supply voltage in the normal wiring 11 or the redundant wiring 13 is supplied to the power supply wiring 67. The power supply 57 generates a power supply voltage for operating the sensor 55, the communication IC 56, and the like based on the power supply voltage in the power supply wiring 67, and supplies the power supply voltage to the sensor 55 and the communication IC 56 via power supply wirings 69 and 68, and the like.

The sensor 55 operates using the power supply voltage in the power supply wiring 69 as an operating voltage, and supplies data according to external environment information to the communication IC 56 via a signal wiring 71. The communication IC 56 transmits the data supplied from the sensor 55 to the normal wiring 11 or the redundant wiring 13 via the capacitor 59 or 60.

The inductor 62 is connected between the normal wiring 11 and a power supply wiring (connection node) 66, and the inductor 61 is connected between the redundant wiring 13 and a power supply wiring (connection node) 65. The capacitors 59 and 60 and the inductors 61 and 62 are provided in the external environment recognition sensor a5 to separate sensor data as an AC component from power as a DC component similarly to the capacitors 25 and 26 and the inductors 27 and 28 described in the control circuit 3.

The power supply monitor 58 monitors the power supply voltages supplied from the control circuits 3 and 4 via the normal wiring 11 and the redundant wiring 13, controls the switches 64 and 63, and supplies a control signal to the communication IC 56 via a signal wiring 70. The switch 64 is connected between the connection node 66 and a voltage wiring 67, and the switch 63 is connected between the connection node 65 and a voltage wiring 67. The switch 64 is switched between conduction and non-conduction by a control signal supplied from the power supply monitor 58 via a signal wiring 72. Similarly, the switch 63 is switched between non-conduction and conduction by a control signal supplied from power supply monitor 58 via a signal wiring 73. Incidentally, it can be regarded that the switch 63 and the switch 64 form a switch unit.

The power supply monitor 58 includes an input node connected to the connection node 66 and an input node connected to the connection node 65, monitors voltages of the connection nodes 65 and 66, and outputs a control signal according to a monitored result to the switches 63 and 64 and the communication IC 56.

As described above, the external environment recognition sensor b6 has the same configuration as the external environment recognition sensor a5, and thus, only the correspondence relationship will be described. In the external environment recognition sensor b6, a sensor 74 corresponds to the sensor 55, a power supply 76 corresponds to the power supply 57, a communication IC 75 corresponds to the communication IC 56, a power supply monitor 77 corresponds to the power supply monitor 58, and switches 82 and 83 correspond to the switches 63 and 64. In addition, in the external environment recognition sensor b6, inductors and 81 correspond to the inductors 62 and 61, and capacitors 78 and 79 correspond to the capacitors 60 and 59.

FIG. 2 illustrates a state during a normal operation in which no failure or the like occurs as conduction/non-conduction states of the switches 63, 64, 82, and 83. That is, during the normal operation, the power supply monitors and 77 control the switches 63, 64, 82, and 83 using control signals such that, among the switches 63, 64, 82, and 83, the switches (normal power supply switches) 64 and connected to the normal wirings 11 and 14 via the inductors are set to the conduction state, and the switches (redundant power supply switches) 63 and 83 connected to the redundant wirings 13 and 12 via the inductors are set to the non-conduction state.

During the normal operation, a power supply abnormality such as a disconnection and a short circuit does not occur in the normal wirings 11 and 14, and thus, it is also conceivable to set both the normal power supply switches 64 and 82 and the redundant power supply switches 63 and 83 to the conduction state, and supply the power supply voltage from the control circuit to the power supply in the external environment recognition sensor using both the normal wiring and the redundant wiring. However, it is conceivable that the power supply voltages supplied from the control circuit 3 and the control circuit 4 via the normal wiring and the redundant wiring are not necessarily the same due to variations in components constituting the respective control circuits. If both the normal power supply switch and the redundant power supply switch are set to the conduction state in a case where the power supply voltages supplied from the control circuit 3 and the control circuit 4 are different due to variations in components or the like, a current is likely to flow between the power supplies 21 and 38 of the control circuits 3 and 4.

In addition, for example, in a case where there is an abnormality in the power supply 21 or 38, there is a possibility that the influence of the abnormality reaches the power supply in which no abnormality occurs via the normal power supply switch and the redundant power supply switch in the conduction state. In order to prevent these problems, the normal power supply switch and the redundant power supply switch are controlled such that the normal power supply switch is set to the conduction state during the normal operation, and the redundant power supply switch is set to the non-conduction state in the second embodiment.

A specific configuration example of the power supply monitor 58 will be described later with reference to FIG. 4. The power supply monitor 58 monitors voltages of the connection nodes 66 and 65 and determines whether the voltage of the connection node falls within a predetermined normal voltage range. If the voltage of the connection node 66 or 65 deviates from the normal voltage range, the power supply monitor 58 turns a switch connected to a connection node determined to deviate from the normal voltage range into the non-conduction state by a control signal, and turns a switch connected to a connection node determined to fall within the normal voltage range into the conduction state by a control signal. That is, the power supply monitors 58 and 77 detect whether the voltage in the normal wiring and the voltage in the redundant wiring fall within the normal voltage range, thereby detecting an abnormality related to the power supplied via the normal wiring and the redundant wiring in the second embodiment. The power supply monitors 58 and 77 can be regarded as second detection units that detect the abnormality related to the power supply.

<Operation when Abnormality Occurs in Normal Wiring>

Figure 3:
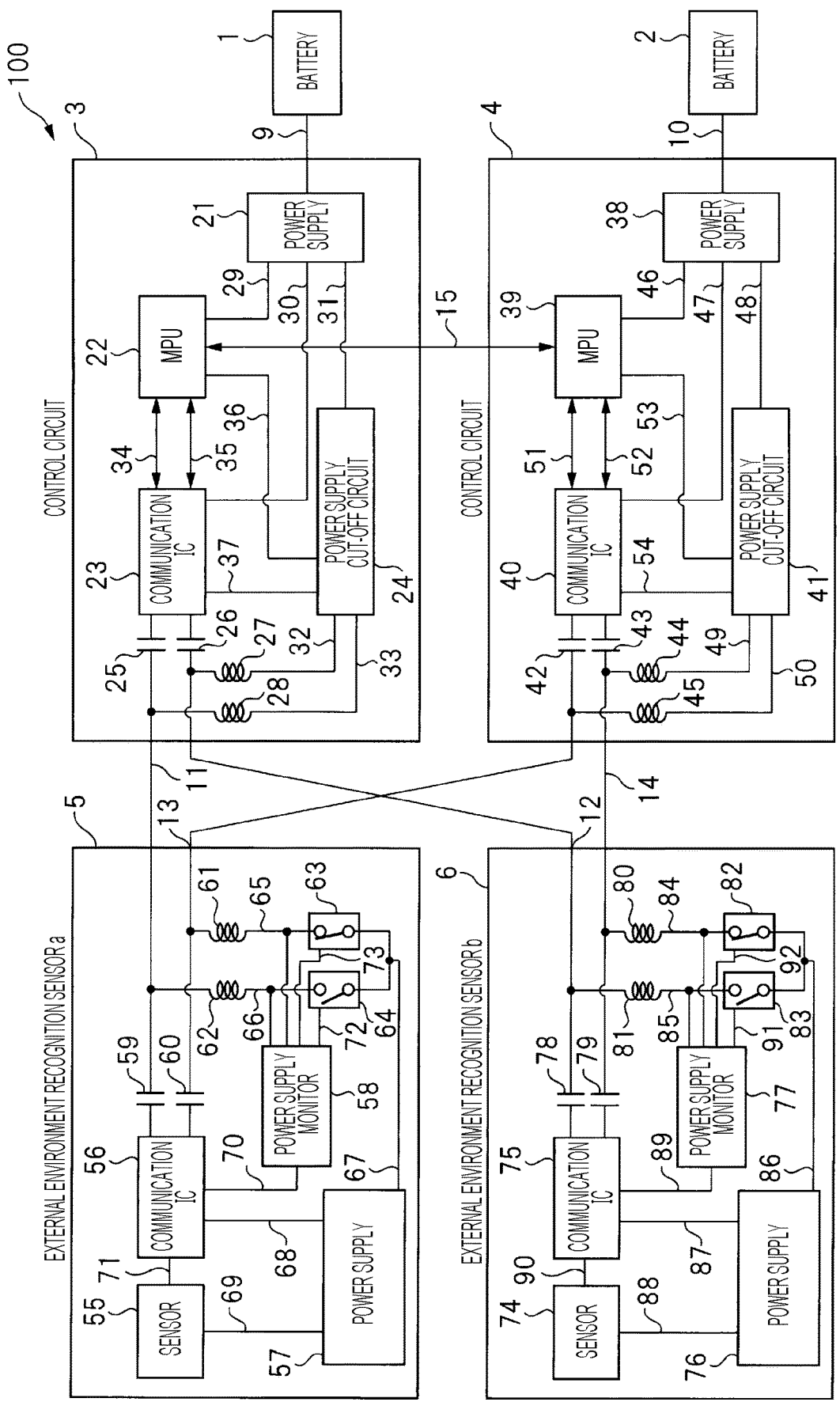
FIG. 3 is a block diagram for describing an operation of the in-vehicle control system according to the second embodiment.

FIG. 3 is a block diagram for describing an operation of the in-vehicle control system according to the second embodiment. FIG. 3 is similar to FIG. 2, and a difference is that the normal power supply switch 64 is set to the non-conduction state and the redundant power supply switch 63 is set to the conduction state. That is, FIG. 3 illustrates a state where a power supply voltage of the normal wiring 11 becomes an abnormal voltage and a voltage of the connection node 66 is out of the normal voltage range. Incidentally, the voltages in the normal wiring 14 and the redundant wiring 13 are not abnormal, and thus, the normal power supply switch 82 and the redundant power supply switch 83 are in the same state as that in the normal operation illustrated in FIG. 2.

In this case, when the power supply monitor 58 detects that the power supply voltage of the connection node 66 is out of the normal voltage range, the power supply monitor 58 controls the switches 64 and 63 such that the normal power supply switch 64 is set to the non-conduction state and the redundant power supply switch 63 is set to the conduction state. In addition, the power supply monitor 58 notifies the communication IC 56 of the occurrence of the abnormality in the normal wiring 11 by the control signal via the signal wiring 70.

When the abnormality of the normal wiring 11 is notified, the communication IC 56 switches a transmission destination of data from the sensor 55 from the normal wiring 11 to the redundant wiring 13. In addition, the power supply cut-off circuit 24 monitors the voltage and current in the power supply wirings 32 and 33 in the control circuit 3. Since the abnormality has occurred in the normal wiring 11, a voltage value or a current value in the power supply wiring 33 is out of a predetermined detection range, and the power supply cut-off circuit 24 cuts off the connection between the power supply wiring 31 and the power supply wiring 33, and the occurrence of the abnormality is notified to the communication IC 23 and the MPU 22 via the signal wirings 37 and 36. Since the power supply wiring 33 and the power supply wiring 31 are electrically disconnected by the interruption, it is possible to prevent the other power supply 57 and the like from being affected by the abnormality in the normal wiring 11.

When receiving the notification of the occurrence of the abnormality, the communication IC 23 stops the processing on the data supplied from the normal wiring 11, and also stops the transmission of the data to the MPU 22. In addition, when receiving the notification of the occurrence of the abnormality, the MPU 22 notifies the MPU 39 provided in the control circuit 4 of the occurrence of the abnormality in the normal wiring 11 via the signal wiring 15, and notifies the control circuit 4 via the redundant wiring 13 that the sensor data is transmitted from the external environment recognition sensor a5. In addition, the MPU 22 requests the MPU 39 to transmit the data from the external environment recognition sensor a5 to the MPU 22 via the signal wiring 15.

The MPU 22 in the control circuit 4 that has received the notification and the request from the MPU 39 notifies the communication IC 40, via the signal wiring 51 or 52, that the data from the external environment recognition sensor a5 is transmitted to the control circuit 4 via the redundant wiring 13. The communication IC 40 that has received the notification starts receiving the data of the external environment recognition sensor a5 transmitted via the redundant wiring 13, and transmits the received data to the MPU 39 via the signal wiring 51 or 52. In addition, the communication IC 40 receives data of the external environment recognition sensor b6 transmitted via the normal wiring 14 and transmits the received data to the MPU 39 via the signal wiring 52 or 51 as in the normal operation.

The MPU 39 executes predetermined control calculation on the data of the external environment recognition sensor a5 and the data of the external environment recognition sensor b6 transmitted from the communication IC 40, and transmits both the data of the external environment recognition sensor a5 and the data of the external environment recognition sensor b6 to the MPU 22 via the signal wiring 15. The MPU 22 executes predetermined control calculation on the data of the external environment recognition sensor a5 and the data of the external environment recognition sensor b6 transmitted from the MPU via the signal wiring 15. In addition, the MPU 22 transmits a result of the executed predetermined control calculation to the MPU 39 via the signal wiring 15, and the MPU 39 also transmits a result of the executed predetermined control calculation to the MPU 22 via the signal wiring 15. The predetermined calculation results are compared by each of the MPUs 22 and 39, the MPUs 22 and 39 transmit a result of the comparison to a host system, and a fact that a failure has occurred is transmitted to the host system and is notified to a user.

<Operation when Normal Wiring is Short-Circuited or Disconnected>

Even when a normal wiring is short-circuited to a ground voltage, a battery, or the like (ground fault or power supply fault) or the normal wiring is disconnected, the short circuit or the disconnection is detected so that the in-vehicle control system 100 can continue the operation.

For example, when the normal wiring 11 is short-circuited to the ground voltage or the battery, a voltage or a current of the voltage wiring 33 in the control circuit 3 corresponding to the external environment recognition sensor a5 changes due to the short circuit. For example, due to the short circuit, the voltage or current in the voltage wiring 33 increases, or the current flows back. As a result, the voltage or current in the voltage wiring 33 is out of a predetermined detection range set in the power supply cut-off circuit 24, and is detected as described in <Operation When Abnormality Occurs in Normal Wiring>, and the in-vehicle control system 100 continues the operation.

For example, when the normal wiring 11 is short-circuited to GND or short-circuited to a battery voltage or the like, an abnormality of the voltage or an increase or reverse flow of the current occurs in the power supply wiring 33, and the power supply cut-off circuit 24 can detect that the voltage or the current is out of the predetermined detection range. In addition, when a disconnection occurs, the current does not flow through the power supply wiring 33, and thus, the power supply cut-off circuit 24 can detect that the current is out of the detection range.

Although the normal wiring 11 has been described as an example, the same applies to a case where the normal wiring 14 is short-circuited or disconnected.

<Operation when Abnormality Occurs in Redundant Wiring>

Next, an operation when an abnormality occurs in a redundant wiring, which is not used for data transmission and power supply of a power supply voltage, during a normal operation will be described. Here, a case where an abnormality occurs in the redundant wiring 13 will be described as an example.

When an abnormality occurs in the redundant wiring 13, a voltage value or a current value in the power supply wiring 50 deviates from a predetermined detection range set in the power supply cut-off circuit 41. Therefore, the power supply cut-off circuit 41 notifies the communication IC 40 and the MPU 39 of the occurrence of the abnormality by a control signal via the signal wirings 54 and 53. In addition, the power supply cut-off circuit 41 cuts off a connection between the power supply wiring 50 and the power supply wiring 48, and electrically disconnects the power supply wiring 50 and the power supply wiring 48 from each other.

When receiving the notification of occurrence of the abnormality, the MPU 39 notifies the MPU 22 in the control circuit 3 that the redundant wiring 13 is abnormal. In addition, the MPU 39 notifies the host system and the user that a failure has occurred and repair is necessary.

Incidentally, even if the redundant wiring is abnormal, the vehicle is controlled by the control circuits 3 and 4 as in the normal operation unless an abnormality occurs in a normal wiring. Although the redundant wiring 13 has been described as an example, the same applies to a case where an abnormality occurs in the redundant wiring 12.

<Operation When Abnormality Occurs in Power Supply System such as Power Supply and Battery>

The case where an abnormality occurs in a normal wiring or a redundant wiring has been described. However, when an abnormality occurs in power supply voltages output from the power supplies 21 and 38 or even when an abnormality occurs in power supply from the batteries 1 and 2 to the control circuits 3 and 4, the abnormality is detected, and the in-vehicle control system 100 can continue the operation.

A case where an abnormality occurs in a power supply voltage output from the power supply 21 and/or an abnormality occurs in a power supply voltage from the battery 1 will be described as an example. When an abnormality occurs in the power supply 21 and/or the battery 1, a voltage in the normal wiring 11 changes, and a voltage in the connection node 66 changes to fall outside a predetermined normal voltage range set in the power supply monitor 58. The power supply monitor 58 detects that the voltage at the connection node 66 is out of the predetermined normal voltage range, and operates so as to switch the normal power supply switch 64 from the conduction state to the non-conduction state, and switch the redundant power supply switch 63 from the non-conduction state to the conduction state. In addition, the power supply monitor 58 notifies the communication IC 56 of the abnormality via the signal wiring 70. When receiving the notification, the communication IC 56 changes a transmission destination of sensor data so as to supply the data of the sensor 55 from the normal wirings 11 to the redundant wiring 13.

In this case, the power supply cut-off circuit 24 corresponding to the battery 1 and the power supply 21 does not operate. This is because there is a case where a power supply voltage supplied to the power supply cut-off circuit becomes the ground voltage, for example, due to the abnormality in the battery 1 and/or the power supply 21, and an operating voltage is not supplied to the power supply cut-off circuit 24 in this case. In this case, no operating voltage is supplied to the MPU 22 and the communication IC 23. Therefore, the control circuit 3 is in a non-operating state.

As described above, since the data of the sensor 55 provided in the external environment recognition sensor a5 is transmitted to the redundant wiring 13, a voltage or a current in the redundant wiring 13 changes according to the data of the sensor 55. The power supply cut-off circuit 41 provided in the control circuit 4 detects, for example, a change in current in the voltage wiring 50 connected to the redundant wiring 13 via the inductor 45, and notifies the communication IC 40 of the change in current via the signal wiring 54. When the communication IC 40 that has received the notification checks data in the redundant wiring 13, notifies the MPU 39 that the data is transmitted from the redundant wiring 13 through the signal wiring 51 or 52 if confirming that the data is data from the external environment recognition sensor a5, and transmits the data received from the redundant wiring 13 to the MPU 39 through the signal wiring 51 or 52.

The MPU 39 receives the data and the notification from the communication IC 40, and attempts communication with the MPU 22 in the control circuit 3 via the signal wiring 15. When there is no response from the MPU 22 within a predetermined time, for example, in this communication, the MPU 39 executes predetermined control calculation on the data from the external environment recognition sensor a5 transmitted using the redundant wiring 13 and the data from the external environment recognition sensor b6 transmitted using the normal wiring 14, and controls the vehicle based on results of the control calculation. In addition, the MPU 39 determines that an abnormality has occurred in the power supply 21 and/or a power supply system such as the battery 1 in the control circuit 3, and notifies the host system and the user of the abnormality.

Although the abnormality of the power supply system in the control circuit 3 has been described as an example, the same applies to a case where an abnormality occurs in a power supply system in the control circuit 4. In this case, instead of the MPU 39, the MPU 22 controls the vehicle based on the data of the external environment recognition sensors a5 and b6, and notifies the host system and the user of the abnormality of the power supply system in the control circuit 4.

As a result, the in-vehicle control system 100 can continue the operation even if an abnormality occurs in the power supply system in the control circuit 3 or 4.

In the first and second embodiments, the abnormality in the normal wiring and the redundant wiring is detected based on the abnormality in the power supply voltage, and control is performed to switch a path for transferring sensor data. Therefore, the time required until switching of the path for transferring the sensor data can be shortened as compared with control of detecting the occurrence of the abnormality in the data of the external environment recognition sensor based on the occurrence of the abnormality in the power supply voltage.

In addition, in the second embodiment, it is possible to switch between the normal power supply switch and the redundant power supply switch before the power supply voltage supplied from the control circuit to the external environment recognition sensor falls below the operating voltage at which the external environment recognition sensor can be operated. For example, the power supply voltage supplied via the normal wiring 11 is supplied to the power supply 57, and the power supply 57 generates the power supply voltage for operating the sensor 55 and the communication IC 56, but the power supply monitor 58 changes the redundant power supply switch from the non-conduction state to the conduction state before the power supply voltage generated by the power supply 57 falls below a normal operating voltage range in which the sensor 55 and the communication IC 56 can normally operate when the voltage in the normal wiring 11 drops. As a result, even when the voltage in the normal wiring 11 drops, it is possible to supply an appropriate operating voltage to the sensor 55 and the communication IC 56, and it is possible to prevent the sensor 55 and the communication IC 56 from being turned into an abnormally operating state to cause a power-on reset operation, and thus, it is possible to shorten a recovery time from a failure to a normal operation.

In addition, when the redundant power supply switch 63 is changed to the conduction state, the power supply monitor changes the normal power supply switch 64 from the conduction state to the non-conduction state. As a result, it is possible to prevent the redundant wiring 13 from being affected by the voltage drop in the normal wiring 11.

Although the voltage drop in the normal wiring 11 has been described as an example, the same applies to the case where the voltage in the normal wiring 14 drops.

Although the case where the connection between the external environment recognition sensor and the control circuit is the PoC connection has been described in the first and second embodiments, the connection is not limited thereto. That is, it is sufficient to adopt a configuration in which power and data are transferred between ab external environment recognition sensor and a control circuit using the same wiring. Note that a control system such as a brake system and a steering system is also required for vehicle control in addition to the above-described external environment recognition sensor and control circuit, but is not illustrated in the first and second exemplary embodiments.

Third Embodiment

In a third embodiment, specific examples of the power supply monitors 58 and 77 and the power supply cut-off circuits 24 and 41 will be presented.

<Power Supply Monitor>

Figure 4:
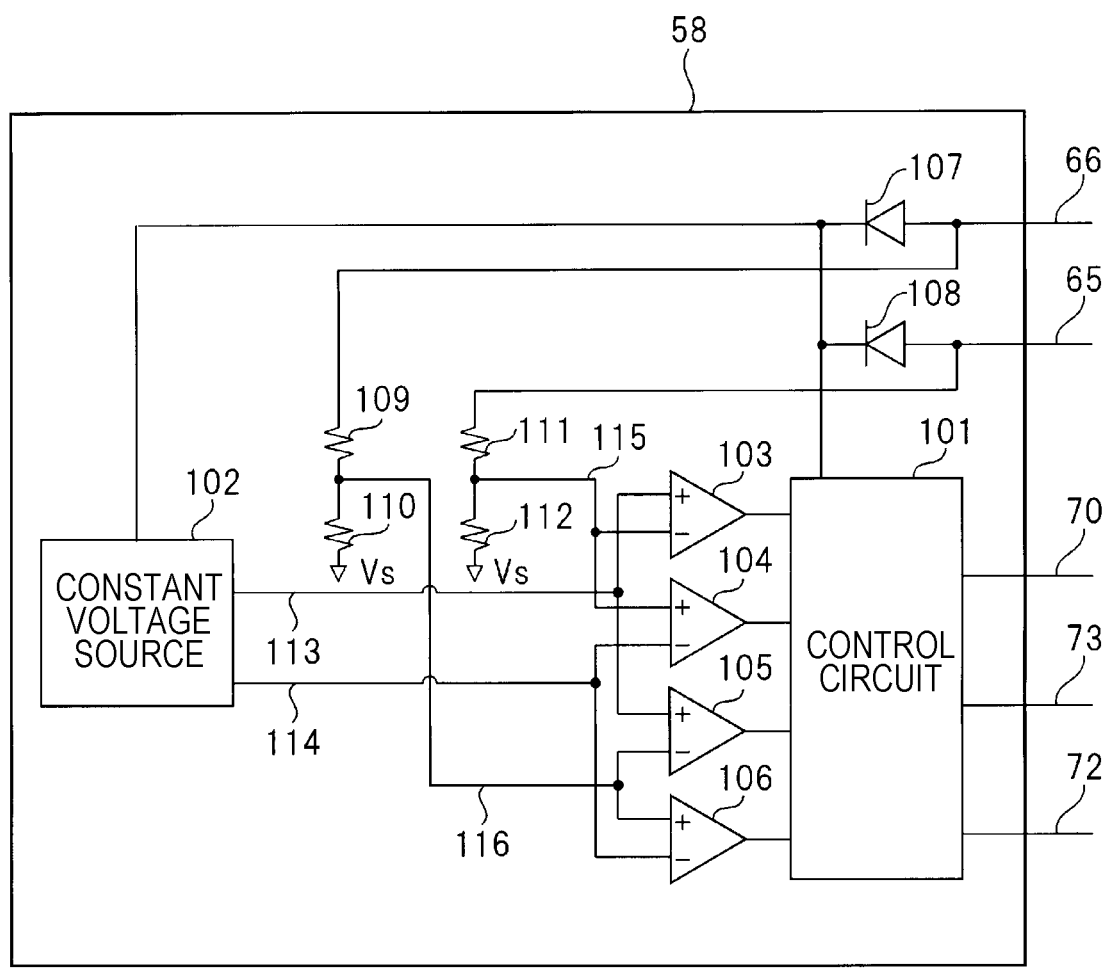
FIG. 4 is a block diagram illustrating a configuration of a power supply monitor according to a third embodiment.

FIG. 4 is a block diagram illustrating a configuration of the power supply monitor according to the third embodiment. Since the power supply monitors 58 and 77 have the same configuration, the power supply monitor 58 will be described here as a representative example. The power supply monitor 58 includes a control circuit 101, a constant voltage source 102, comparators 103, 104, 105, and 106, resistors 109, 110, 111, and 112, and diodes 107 and 108.

The connection node 66 connected to the normal wiring via the inductor 62 illustrated in FIGS. 3 and 4 is connected to an anode of the diode 107, and the connection node 65 connected to the redundant wiring 13 via the inductor 61 is connected to an anode of the diode 108. Cathodes of the diodes 107 and 108 are connected in common. The cathodes in the common connection of the diodes 107 and 108 are connected to the control circuit 101, the constant voltage source 102, and the comparators 103 to 106. Incidentally, FIG. 4 does not illustrate the connection between the cathodes in the common connection and the comparators 103 to 106 in order to avoid complication of the drawing.

A diode OR is configured by connecting the cathodes of the diodes 107 and 108 in common, and voltages in the normal wiring 11 and the redundant wiring 13 are supplied as power supply voltages of the control circuit 101, the constant voltage source 102, and the comparators 103 to 106. In addition, when the normal wiring 11 or the redundant wiring 13 is short-circuited to a ground voltage and a voltage of the connection node 66 or 65 drops, the diode 107 or 108 connected to a connection node connected to the short-circuited normal wiring or redundant wiring via an inductor is turned into a reverse bias state. Therefore, the power supply voltage is supplied from the diode 107 or 108 connected to a normal wiring or a redundant wiring, which is not short-circuited, to the control circuit 101, the constant voltage source 102, and the comparators 103 to 106, and the control circuit 101, the constant voltage source 102, and the comparators 103 to 106 can operate normally.

In addition, a withstand voltage of an element constituting the voltage monitor 58 that is higher than a voltage of the battery 1 is used, and a normal operation range of the element is designed to be higher than the voltage of the battery 1. As a result, even when either the normal wiring 11 or the redundant wiring 13 is short-circuited to the battery 1, the power supply monitor 58 can operate normally.

The resistors 109 and 110 are connected in series between the connection node 66 and a ground voltage Vs. A connection node between the resistors 109 and 110 is connected to an input (−) of the comparator 105 and an input (+) of the comparator 106 via a voltage wiring 116. As a result, a voltage in the connection node 66 is divided by a resistance ratio between the resistors 109 and 110, and the divided voltage formed by the division is supplied to the input (−) of the comparator 105 and the input (+) of the comparator 106. Similarly, the resistors 111 and 112 are connected in series between the connection node 65 and the ground voltage Vs. A connection node between the resistors 111 and 112 is connected to an input (−) of the comparator 103 and an input (+) of the comparator 104 via a voltage wiring 115. As a result, a voltage in the connection node 65 is divided by a resistance ratio between the resistors 111 and 112, and the divided voltage formed by the division is supplied to the input (−) of the comparator 103 and the input (+) of the comparator 104.

The constant voltage source 102 operates to generate a voltage, obtained by multiplying a limit value (upper limit voltage) on a high voltage side of a normal voltage range in which the sensor 55, the communication IC 56, the power supply 57, and the like included in the external environment recognition sensor a5 can be normally operated, by a voltage division ratio between the resistors 109 and 110, as an upper limit voltage, and to output the upper limit voltage to a voltage wiring 114. In addition, the constant voltage source 102 operates to generate a voltage, obtained by multiplying a limit value (lower limit voltage) on a low voltage side of a normal voltage range in which the sensor 55, the communication IC 56, the power supply 57, and the like included in the external environment recognition sensor a5 can be normally operated, by a voltage division ratio between the resistors 111 and 112, as a lower limit voltage, and to output the lower limit voltage to a voltage wiring 113.

The comparators 104 and 106 compare the voltages at the connection nodes 66 and 65 with the upper limit value to determine whether the voltages exceed the upper limit value. In addition, the comparators 103 and 105 compare the voltages at the connection nodes 65 and 66 with the lower limit value to determine whether the voltages exceed the lower limit value. That is, the comparators 105 and 106 determine whether the voltage in the connection node 66 falls within or outside the normal voltage range described above, and the comparators 103 and 104 determine whether the voltage in the connection node 65 falls within or outside the normal voltage range described above. The comparison results of the comparators 103 to 106 are supplied to the control circuit 101.

The control circuit 101 determines a high-voltage abnormality and a low-voltage abnormality based on the supplied comparison results. That is, it is determined that the voltage in the normal wiring 11 has the high-voltage abnormality when the voltage in the connection node 66 exceeds the upper limit value, and it is determined that the voltage in the redundant wiring 13 has the high-voltage abnormality when the voltage in the connection node 65 exceeds the upper limit value. In addition, the control circuit 101 determines that the voltage in the normal wiring 11 has the low-voltage abnormality when the voltage in the connection node 66 is lower than the lower limit value, and determines that the voltage in the redundant wiring 13 has the low-voltage abnormality when the voltage in the connection node 65 is lower than the lower limit value. The control circuit 101 generates a control signal based on a determination result and outputs the control signal to the signal wirings 70, 72, and 73.

For example, when determining that the voltage in the normal wiring 11 has the high-voltage abnormality or the low-voltage abnormality, the control circuit 101 outputs a control signal for turning the normal power supply switch 64 into a non-conduction state to the signal wiring 72, outputs a control signal for turning the redundant power supply switch 63 into a conduction state to the signal wiring 73, and outputs a control signal for notifying the occurrence of the abnormality to the communication IC 56 via the signal wiring 70. Although the power supply monitor 58 has been described as an example, the same applies to the power supply monitor 77.

<Power Supply Cut-Off Circuit>

Figure 5:
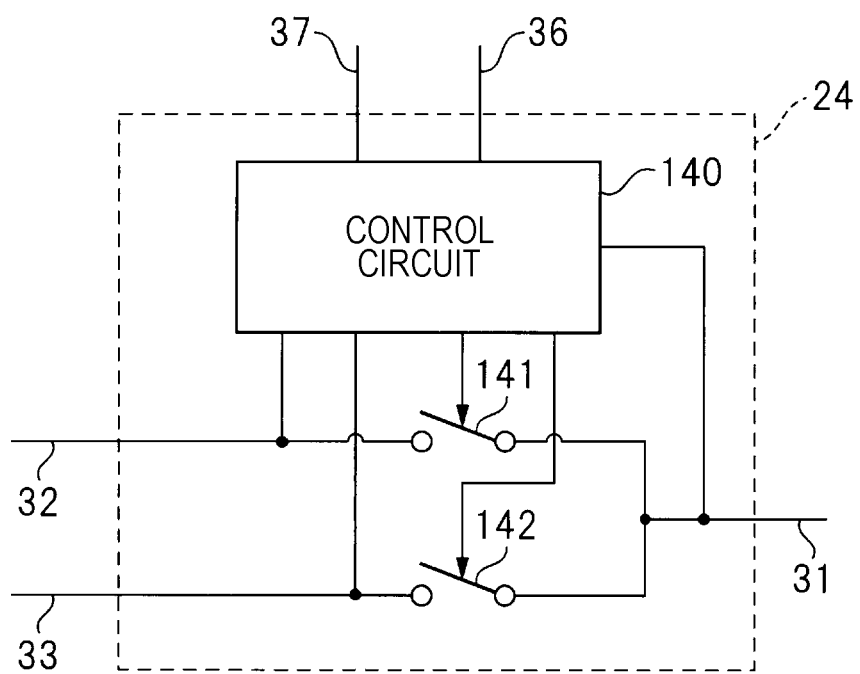
FIG. 5 is a block diagram illustrating a configuration of a power supply cut-off circuit according to the third embodiment.

FIG. 5 is a block diagram illustrating a configuration of the power supply cut-off circuit according to the third embodiment. Since the power supply cut-off circuits 24 and 41 illustrated in FIGS. 2 and 3 have the same configuration, the power supply cut-off circuit 24 will be described here as a representative example.

The power supply cut-off circuit 25 includes a control circuit 140, a normal cut-off switch 142, and a redundant cut-off switch 141. The normal cut-off switch 142 is connected between the power supply wiring 31 and the power supply wiring 33, and the redundant cut-off switch 141 is connected between the power supply wiring 31 and the power supply wiring 32. As described with reference to FIG. 2, the power supply wiring 31 is connected to the power supply 21, and a power supply voltage is supplied from the power supply 21. In addition, the power supply wiring 33 is connected to the normal wiring 11 via the inductor 28, and the power supply wiring 32 is connected to the redundant wiring 12 via the inductor 27.

The control circuit 140 is connected to the power supply wirings 32 and 33, and compares a voltage and a current in the power supply wirings 32 and 33 with a predetermined voltage range and a predetermined current range that are set in advance to monitor whether the voltage and current in the power supply wirings 32 and 33 falls within or outside a predetermined detection range, and switches the normal cut-off switch 142 and the redundant cut-off switch 142 to the conduction state or the non-conduction state according to a monitoring result. In addition, the control circuit 140 generates a control signal according to the monitoring result, and notifies the MPU 22 and the communication IC 23 according to the monitoring result via the signal wirings 36 and 37.

The control circuit 140 starts operating when a power supply voltage is supplied via the power supply wiring 31. When the operation is started, the control circuit 140 controls the normal cut-off switch 142 and the redundant cut-off switch 141 by the control signal such that both the normal cut-off switch 142 and the redundant cut-off switch 141 are turned into the conduction state. As described above, the control circuit 140 compares the voltage and current in both the power supply wirings 32 and 33 with the predetermined voltage range and the predetermined current range set in advance. When it is determined by the comparison that the voltage and the current in the power supply wirings 32 and 33 fall within the preset predetermined voltage range and current range, the control circuit 140 controls both the normal cut-off switch 142 and the redundant cut-off switch 141 such that these switches are continuously in the conduction state.

On the other hand, when it is determined by the comparison that the voltage or/and the current in the power supply wiring 33 or 32 deviates from the predetermined voltage range or/and current range, the control circuit 140 controls the normal cut-off switch 142 or the redundant cut-off switch 141 by the control signal so as to switch the normal cut-off switch 142 or the redundant cut-off switch 141, connected to the power supply wiring 33 or 32 in which the voltage or current deviates outside the predetermined voltage range or/and current range, from the conduction state to the non-conduction state.

For example, when the voltage in the power supply wiring 33 deviates from the predetermined voltage range, the control circuit 140 performs control such that the normal cut-off switch 142 connected to the power supply wiring 33 is switched to the non-conduction state, and the redundant cut-off switch 141 maintains the conduction state. In addition, in this case, the control circuit 140 notifies the MPU 22 and the communication IC 23 of the occurrence of the abnormality in the normal wiring 11 by the control signal via the signal wirings 36 and 37. With this notification, the MPU 22 and the communication IC operate as described in the first and second embodiments.

In addition, the control circuit 140 detects a change in current flowing through the power supply wiring 32 corresponding to the redundant wiring 12. When detecting the change in the current flowing through the power supply wiring 32, the control circuit 140 notifies the MPU 22 that the current change occurs in the redundant wiring 12 by the control signal via the signal wiring 36 while maintaining both the normal cut-off switch 142 and the redundant cut-off switch 141 in the conduction state. With this notification, the MPU 22 executes an operation of attempting communication with the MPU 39 as described in <Operation When Abnormality Occurs in Power Supply System such as Power Supply and Battery> of the second embodiment. Incidentally, it can be regarded that the normal cut-off switch 141 and the redundant cut-off switch 142 form a switch unit. In this case, the control circuit 140 can be regarded as a detection control unit that detects an abnormality and notifies the MPU 22 and the communication IC 23 of the abnormality.

Fourth Embodiment

Figure 6:
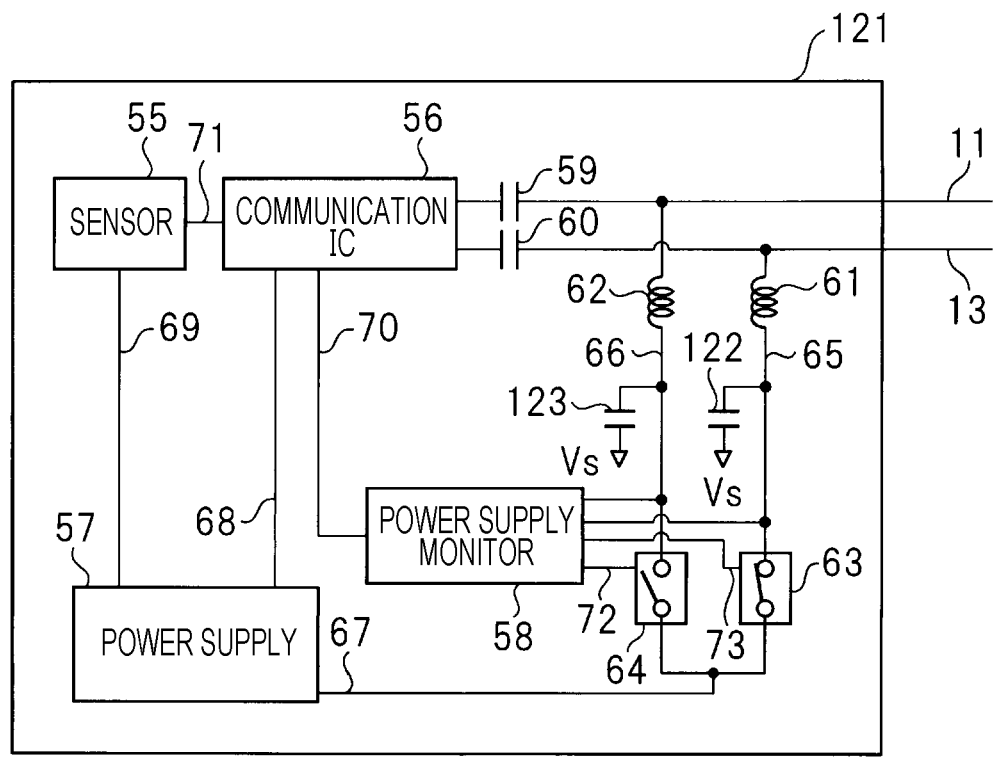
FIG. 6 is a block diagram illustrating a configuration of an external environment recognition sensor according to a fourth embodiment.

FIG. 6 is a block diagram illustrating a configuration of an external environment recognition sensor according to a fourth embodiment. An external environment recognition sensor 121 illustrated in FIG. 6 is similar to the external environment recognition sensor a5 illustrated in FIG. 3. A difference is a the capacitor 123 is connected between the connection node 66 and the ground voltage Vs, and a capacitor 122 is connected between the connection node 65 and the ground voltage Vs. In the fourth embodiment, the inductor 62 and the capacitor 123 form a low-pass filter for a normal wiring, and the inductor 61 and the capacitor 122 form a low-pass filter for a redundant wiring. When an abnormality occurs and a power supply voltage in the normal wiring 11 or the redundant wiring 13 changes, a voltage in the connection node 66 or 65 also changes. However, the capacitors 123 and 122 forming the low-pass filters are connected to the connection nodes 66 and 65, and thus, the voltage change at the connection node 66 or 65 is slower than the voltage change at the normal wiring 11 or the redundant wiring 13. Therefore, it is possible to reduce the voltage change at the connection node 66 or 65 during a period in which the normal power supply switch 64 and the redundant power supply switch 63 are switched. That is, capacitance values of the capacitors 122 and 123 forming the low-pass filters are set such that the voltage changes in the connection nodes 65 and 66 are sufficiently small during the time until the power supply monitor 58 detects the abnormality of the voltage and switches the switches 63 and 64. In other words, a time constant of the low-pass filter is set to be longer than a response time of a second detection unit.

Accordingly, when the states of the normal power supply switch 64 and the redundant power supply switch 63 are switched, a change in a voltage supplied to the power supply can be sufficiently reduced, and a change in a power supply voltage output from the power supply 57 can be set to a voltage change that falls within a normal operation range of the sensor 55 and the communication IC 56.

That is, even when a voltage abnormality occurs in the normal wiring 11 and the redundant wiring 13 and the states of the normal power supply switch 64 and the redundant power supply switch 63 are switched, the power supply voltage with a sufficiently small voltage fluctuation can be supplied from the power supply 57 to the sensor 55 and the communication IC 56. As a result, even if a power supply abnormality occurs, it is possible to switch the power supply and continue the operation without generating a malfunction in the sensor 55 or the communication IC or generating a state where it is difficult to obtain sensor data due to a power-on reset operation caused by the power supply fluctuation.

Fifth Embodiment

Figure 7:
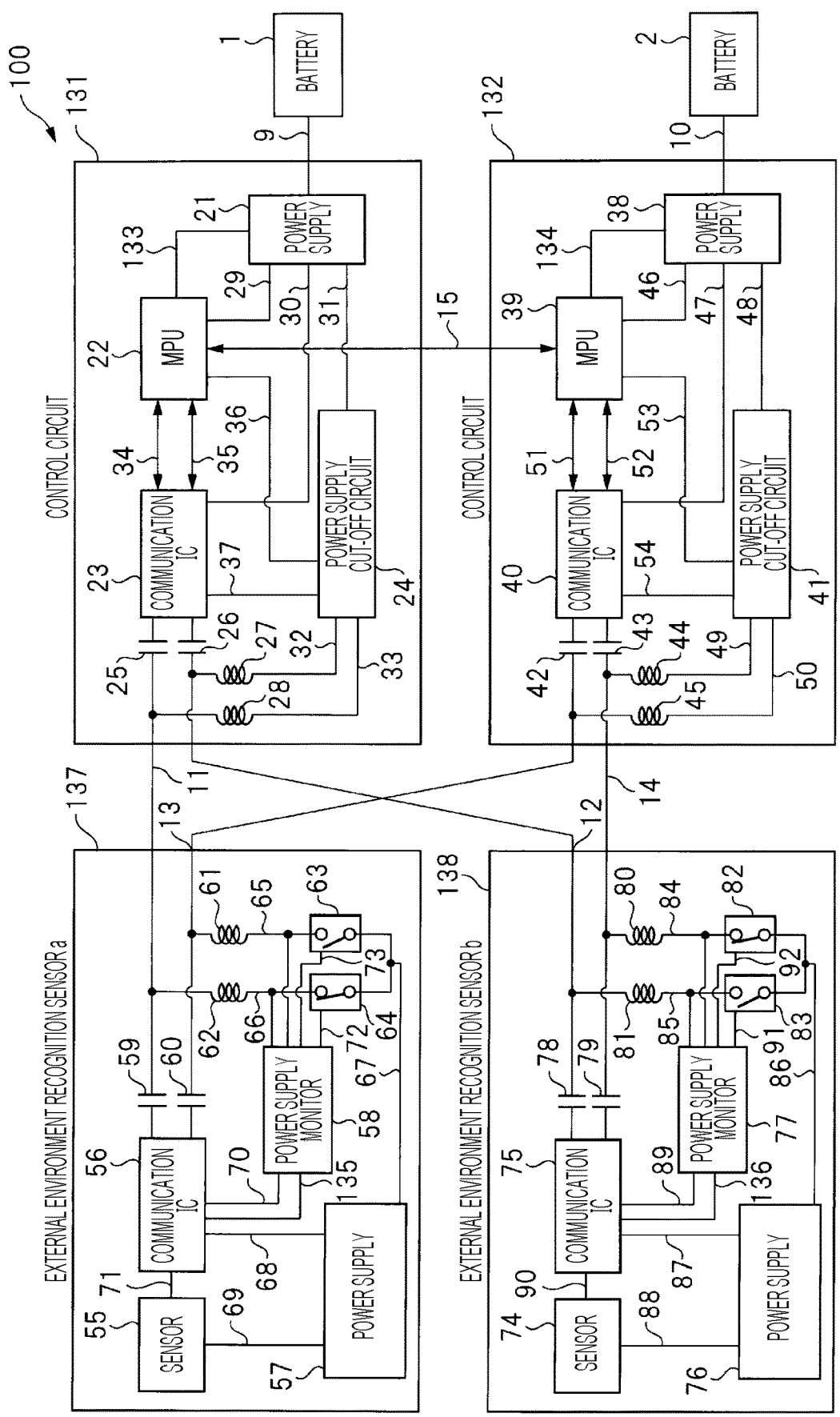
FIG. 7 is a block diagram illustrating a configuration of an in-vehicle control system according to a fifth embodiment.

In a fifth embodiment, the in-vehicle control system 100 capable of testing abnormality detection and an operation at the time of detecting an abnormality is provided. FIG. 7 is a block diagram illustrating a configuration of the in-vehicle control system according to the fifth embodiment. Since FIG. 7 is similar to FIG. 2, differences will be mainly described.

In FIG. 7, a signal wiring 133 connecting the power supply 21 and the MPU 22 is added to the control circuit 3 illustrated in FIG. 2, and the reference sign of the control circuit 3 is changed to 131. Similarly, a signal wiring 134 connecting the power supply 38 and the MPU 39 is added to the control circuit 4, and the reference sign of the control circuit 4 is changed to 132. In addition, in FIG. 7, a signal wiring 135 connecting the power supply monitor 58 and the communication IC 56 is added to the external environment recognition sensor a5 illustrated in FIG. 2, and the reference sign of the external environment recognition sensor a5 is changed to 137. Similarly, a signal wiring 136 connecting the power supply monitor 77 and the communication IC 75 is added to the external environment recognition sensor b6 illustrated in FIG. 2, and the reference sign of the external environment recognition sensor b6 is changed to 138. In addition, the power supplies 21 and 38 are variable power supplies capable of changing voltages to be output.

<Method of Testing Voltage Abnormality Detection Operation and Data Path Switching Operation>

First, a method of testing a voltage abnormality detection operation and a data path switching operation will be described. In this case, the MPU 22 instructs the power supply 21 to output a higher voltage or a lower voltage than usual as a power supply voltage to be output to the power supply wiring 31 via the added signal wiring 133. Here, the higher voltage or lower voltage than usual means a voltage higher or lower than a voltage determined to be normal by the power supply monitors 58 and 77. In other words, the higher voltage or lower voltage than usual is a voltage that causes a power supply monitor to switch states of corresponding normal power supply switch and redundant power supply switch when supplied to the power supply monitor via a wiring.

As a result, the same abnormal state as that when a voltage abnormality occurs can be consciously generated. The voltage abnormality detection operation and a power supply and data path switching operation at the time of detecting the voltage abnormality can be tested by confirming whether the power supply monitors 58 and 77, the switches 63, 64, 82, and 83, the communication ICs 56 and 75, and the power supply cut-off circuits 24 and 41 at this time perform desired operations or not.

Similarly, the MPU 39 instructs the power supply 38 to output a higher voltage or a lower voltage than usual as a power supply voltage to be output to the power supply wiring 48 via the added signal wiring 134. As a result, it is possible to test the voltage abnormality detection operation when the voltage supplied to the external environment recognition sensor via the normal wiring 13 and the redundant wiring 14 becomes abnormal, and the power supply and data path switching operation at the time of detecting the abnormality.

<Detection of High-Resistance States of Normal Wiring and Redundant Wiring>

Next, a test for high-resistance states of the normal wirings 11 and 14 and the redundant wirings 12 and 13 will be described. A state where a normal wiring and a redundant wiring have high resistance without reaching a disconnection is conceivable. When the normal wiring and the redundant wiring are set to the high-resistance states, there is a possibility that data transfer is delayed or/and power supplied to the external environment recognition sensor is reduced.

In this case, a control signal indicating the test for the high-resistance state is supplied from the MPU 22 to the communication IC 23 via the signal wiring 34 or 35. The communication IC 23 transmits the control signal indicating the test for the high-resistance state to the communication IC 56 via the normal wiring 11. The communication IC 56 transmits the received control signal to the power supply monitor 58 via the added signal wiring 135. When the control signal is supplied via the signal wiring 135, to the power supply monitor 58 supplies a control signal for turning both the normal power supply switch 64 and the redundant power supply switch 63 into a conduction state, to the normal power supply switch 64 and the redundant power supply switch 63 via the signal wirings 72 and 73.

For example, in the power supply monitor 58 illustrated in FIG. 4, the control circuit 101 is connected to the communication IC 56 via the signal wiring 135. When the control signal indicating the test for the high-resistance state is supplied, the control circuit 101 outputs the control signal for turning both the normal power supply switch 64 and the redundant power supply switch 63 into the conduction state to the signal wirings 72 and 73 as described above.

In addition, the MPU 22 instructs the power supply 21 to change a value of a power supply voltage output to the power supply wiring 31 via the signal wiring 133. With this instruction, the power supply 21 outputs a power supply voltage, which has a value different from a value of a power supply voltage output from the power supply 38 to the power supply wiring 48, to the power supply wiring 31. As a result, a desired voltage difference is set between the power supply wiring 31 and the power supply wiring 48.

Since both the normal power supply switch 64 and the redundant power supply switch 63 are in the conduction state as described above, the normal wiring 11 and the redundant wiring 13 are electrically connected via the normal power supply switch 64 and the redundant power supply switch 63. Therefore, a current according to the set desired voltage difference and resistance values of the normal wiring 11 and the redundant wiring 13 flows between the power supply wiring 31 and the power supply wiring 48. This current is measured by the power supply cut-off circuits 24 and 41. A combined resistance value of the normal wiring 11 and the redundant wiring 13 can be calculated from the measured current value and the set desired voltage difference. It is possible to test whether the calculated resistance value is equal to or less than the combined resistance value of the normal wiring 11 and the redundant wiring 13.

A combined resistance value of the normal wiring 14 and the redundant wiring 12 can be similarly calculated. That is, a control signal indicating the test for the high-resistance state is supplied to the power supply monitor 77 via the signal wiring 136 such that both the normal power supply switch 82 and the redundant power supply switch 83 are turned into the conduction state. In addition, the power supply 38 is instructed to output a power supply voltage having a value different from that of the power supply 21 via the signal wiring 134. At this time, the combined resistance value of the normal wiring 14 and the redundant wiring 12 can be calculated by measuring the current flowing through the voltage wirings 32 and 49 by the power supply cut-off circuits 24 and 41.

Since the test is performed in this manner, it is possible to detect the normal wiring and the redundant wiring in the high-resistance states that are not completely disconnected but are likely to affect data transfer and supply of power.

Although the in-vehicle control system including the two external environment recognition sensors and the two control circuits has been described as an example in the first to fifth embodiments, but the present invention is not limited thereto. That is, the number of external environment recognition sensors and the number of control circuits may be two or more. In addition, the number of external environment recognition sensors may be smaller than the number of control circuits. When a description is given with the first embodiment as an example, the in-vehicle control system 100 may include the external environment recognition sensor a5 and the control circuits 3 and 4. In this case, the external environment recognition sensor a5 is connected to the control circuit 3 by the normal wiring 11 and is connected to the control circuit 4 by the redundant wiring 13. When a power supply abnormality occurs in the normal wiring 11, power is supplied to the external environment recognition sensor a5 from the control circuit 4 via the redundant wiring 13, and data of the external environment recognition sensor a5 is transmitted to the control circuit 4 via the redundant wiring 13. In this case, the control circuit 4 supplies the received data of the external environment recognition sensor a5 to the control circuit 3 via the signal wiring 15. As a result, even when the power supply abnormality occurs in the normal wiring 11, the control circuit 3 corresponding to the external environment recognition sensor a5 can execute control calculation based on the data of the external environment recognition sensor a5. As a result, it is possible to suppress an increase in cost while achieving redundancy.

According to the first to fifth embodiments, the technology related to the external environment recognition sensor, which is particularly important in automatic driving, is provided. That is, according to the first to fifth embodiments, it is possible to realize the multiplexing of the power supply of the external environment recognition sensor of the automobile at low cost and shorten the recovery time from the power supply abnormality.

An in-vehicle control system according to the first to fifth embodiments includes an external environment recognition sensor, and a control circuit that grasps a situation around an automobile based on data of the external environment recognition sensor and determines a trajectory of the vehicle, and performs control. In this case, the control circuit includes two circuits for a normal operation and a redundant operation, respectively, and power is supplied from independent power supply paths to the control circuit for the normal operation and the circuit for the redundant operation. In the external environment recognition sensor, both the control circuit for the normal operation and the control circuit for the redundant operation are connected to a power supply wiring and a signal wiring. As a result, even if an abnormality occurs in one of the power supply systems, power is supplied to the external environment recognition sensor, and the external environment recognition sensor can continue the operation.

In addition, the external environment recognition sensor includes a power supply abnormality detection circuit (for example, the power supply monitor 58 of FIG. 2) and a power supply switching switch (63, 64), and can disconnect the abnormal power supply system from the normal power supply system. In addition, the control circuit also includes a power supply abnormality detection circuit (the power supply cut-off circuit 24) that detects a power supply abnormality of the power supplied to the external environment recognition sensor, and can detect an abnormality when the abnormality occurs in the external environment recognition sensor or a power supply connection path between the external environment recognition sensor and the control circuit and disconnect the abnormal sensor from the power supply system.

In addition, when the power supply abnormality detection circuit on the external environment recognition sensor side detects the power supply abnormality, a power supply path of a power supply switch is switched, and an abnormality detection signal (control signal in the signal wiring 70) is transmitted to a communication IC. As a result, the communication IC switches a signal path for transmitting data of the external environment recognition sensor. In addition, when detecting an abnormality in a control path of the data of the specific external environment recognition sensor, the power supply abnormality detection circuit on the control circuit side notifies an MPU that the abnormality has occurred in the sensor path, and the MPU performs control to switch a path for receiving data from the external environment recognition sensor.

In addition, the in-vehicle control system includes a path (signal wiring 15) through which the control circuit for the normal operation and the control circuit for the redundant operation transmit and receive information with each other. As a result, one control circuit can transmit the data received from the external environment recognition sensor to the other control circuit. As a result, even when an abnormality occurs in one power supply system, the external environment recognition sensor can operate, and the vehicle can perform a fallback operation with data of the external environment recognition sensor equivalent to that in the normal operation. In addition, the power supply is switched by detecting the occurrence of a power supply abnormality based on an abnormality of a power supply voltage or a current value. Thus, it is possible to shorten the time during which the data of the external environment recognition sensor is interrupted when the power supply abnormality occurs since transition to a normal operation state is performed and the occurrence of an abnormality can be detected before the external environment recognition sensor performs an abnormal operation due to the power supply abnormality.

In order to achieve the redundancy, the in-vehicle control system according to the embodiment includes the plurality of control circuits. In a case where power supply to the external environment recognition sensor is performed from the plurality of control circuits and an abnormality occurs in the power supply from any of the control circuits to the external environment recognition sensor, a power supply path and a signal path are changed together, sensor data is shared among the plurality of control circuits, and it is possible to realize the redundancy of the external environment recognition sensor at low cost. In addition, the power supply and the signal paths are switched before the external environment recognition sensor performs an abnormal operation by detecting a power supply abnormality based on an abnormality in the power supply voltage or current abnormality, instead of an abnormality in the data of the external environment recognition sensor and switching the power supply path and a path for transferring sensor data to the control circuit, so that it is possible to shorten the recovery time from the occurrence of the power supply abnormality to the normal operation.

Although the description has been given in detail regarding the invention made by the present inventor based on the embodiments as above, the present invention is not limited to the embodiments, and, of course, can be modified in various ways within a scope not departing from a gist thereof.

REFERENCE SIGNS LIST

1,2 battery
3,4,131,132 control circuit
5,137 external environment recognition sensor a
6,138 external environment recognition sensor b
11,14 normal wiring
12,13 redundant wiring
15 signal wiring
21,38,57,76 power supply
22,39 MPU
23,40,57,75 communication IC
24,41 power supply cut-off circuit
55,57 sensor
58,77 power supply monitor
63,64,82,83 switch
100 in-vehicle control system

The invention claimed is:

1. An in-vehicle control system comprising:
a plurality of control devices respectively including control units that perform data communication with each other;
a first sensor; and
a plurality of wirings connecting the first sensor and the plurality of control devices, wherein each of the plurality of control devices includes:
a first power supply unit that supplies power to a first sensor via a corresponding wiring among the plurality of wirings; and a first detection unit that detects an abnormality related to the power supplied to the first sensor, and
a control unit in a control device including a first detection unit that has detected the abnormality is controlled to acquire data of the first sensor from a control unit included in another control device.

2. The in-vehicle control system according to claim 1, wherein
the plurality of wirings include: a normal wiring that connects a first control device corresponding to the first sensor among the plurality of control devices and the first sensor; and a redundant wiring that connects a second control device different from the first control device and the first sensor, and
when a first detection unit in the first control device detects an abnormality related to power, a control unit in the first control device is controlled to acquire data of the first sensor from a control unit in the second control device.

3. The in-vehicle control system according to claim 2, further comprising
a second sensor different from the first sensor and corresponding to the second control device,
wherein the plurality of wirings include: a normal wiring that connects the second control device and the second sensor; and a redundant wiring that connects the first control device and the second sensor, and
when a first detection unit in the second control device detects an abnormality related to power, the control unit in the second control device is controlled to acquire data of the second sensor from the control unit in the first control device.

4. The in-vehicle control system according to claim 3, wherein
the first detection unit includes:
a switch unit connected between the first power supply unit, and the normal wiring and the redundant wiring; and
a detection control unit that is connected to the normal wiring and the redundant wiring, controls the switch unit such that the normal wiring and the first power supply unit are disconnected when the abnormality is detected, and notifies the control unit of the detection of the abnormality.

5. The in-vehicle control system according to claim 4, wherein each of the first control device and the second control device includes a communication unit that is connected to the normal wiring and the redundant wiring and controlled by the detection control unit, and
data of a sensor received by the communication unit is supplied to the control unit.

6. The in-vehicle control system according to claim 2, wherein
the first sensor includes:
a sensor unit that recognizes an external environment;
a communication unit that is connected to the sensor unit, the normal wiring, and the redundant wiring and transmits data from the sensor unit;
a second power supply unit connected to the sensor unit and the communication unit;
a switch unit connected between the second power supply unit, and the normal wiring and the redundant wiring; and
a second detection unit that monitors power in the normal wiring and the redundant wiring and controls the switch unit based on a result of the monitoring.

7. The in-vehicle control system according to claim 6, wherein
the first sensor further includes a low-pass filter that is connected to the normal wiring and the redundant wiring and has a time constant longer than a response time of the second detection unit.

8. The in-vehicle control system according to claim 2, wherein
the first power supply unit is configured using a variable power supply, and
operation confirmation is performed by changing power supplied from the first power supply unit to the first sensor.

9. The in-vehicle control system according to claim 8, wherein
the first sensor is capable of measuring a resistance value of a wiring based on a voltage difference of power supplied from a first power supply in the plurality of control devices to the plurality of wirings when the plurality of wirings are in a short-circuit state, and a current flowing between the wirings in the short-circuit state.

10. The in-vehicle control system according to claim 1, wherein
power supplied to the first sensor and data of the first sensor are superimposed on the wiring, and the supply of power to the first sensor and data communication are performed through the wiring.

* * * * *